(12) United States Patent
Takemura

(10) Patent No.: US 8,924,968 B2
(45) Date of Patent: Dec. 30, 2014

(54) SYSTEM AND METHOD OF MANAGING VIRTUAL MACHINE, AND CONTROL APPARATUS, METHOD AND PROGRAM

(75) Inventor: Toshinori Takemura, Tokyo (JP)

(73) Assignee: NEC Corporation, Tokyo (JP)

( * ) Notice: Subject to any disclaimer, the term of this patent is extended or adjusted under 35 U.S.C. 154(b) by 619 days.

(21) Appl. No.: 13/255,796

(22) PCT Filed: Mar. 29, 2010

(86) PCT No.: PCT/JP2010/002283
§ 371 (c)(1),
(2), (4) Date: Sep. 9, 2011

(87) PCT Pub. No.: WO2010/113466
PCT Pub. Date: Oct. 7, 2010

(65) Prior Publication Data
US 2011/0321045 A1    Dec. 29, 2011

(30) Foreign Application Priority Data

Mar. 31, 2009    (JP) .................................. 2009-086921

(51) Int. Cl.
    G06F 9/455    (2006.01)
    G06F 15/16    (2006.01)
    G06F 9/50    (2006.01)
(52) U.S. Cl.
    CPC .................................. *G06F 9/5077* (2013.01)
    USPC ............................................. 718/1; 709/219
(58) Field of Classification Search
    None
    See application file for complete search history.

(56) References Cited

U.S. PATENT DOCUMENTS

| 8,489,862 | B2 * | 7/2013 | Saito et al. ..................... 712/43 |
| 2005/0172040 | A1 | 8/2005 | Hashimoto | |
| 2008/0059608 | A1 * | 3/2008 | Wood et al. ................... 709/219 |

FOREIGN PATENT DOCUMENTS

| JP | 2002-318700 A | 10/2002 |
| JP | 2005-165776 A | 6/2005 |
| JP | 2005-222123 A | 8/2005 |
| JP | 2007-18188 A | 1/2007 |
| JP | 2008-299714 A | 12/2008 |

OTHER PUBLICATIONS

Katashi Nagao, "Agent Augmented Reality: Agents Integrate the Real World with Cyberspace", 1998, 25 pages.

* cited by examiner

*Primary Examiner* — Kenneth Tang
(74) *Attorney, Agent, or Firm* — Sughrue Mion, PLLC

(57) ABSTRACT

A virtual machine management system includes an image capturing unit (30) which captures video image of a physical server (10); a marker information storage unit (102) which stores therein a marker (14) and the physical server (10) associated with each other; a display unit (46) which recognizes the marker (14) from the video image, acquires information regarding executable operations with respect to the physical server (10) and the virtual server (12) from a management apparatus (20), and displays the acquired information on a screen together with the video image of the physical server (10); an identification unit (114) which identifies the physical server (10) based on the marker (14), referring to the marker information storage unit (102); an operation acceptance unit (48) which accepts, on the screen, an operation instruction directed to the physical server (10) and the virtual server (12); and an instruction unit (132) which sends the operation instruction to the management apparatus (20).

23 Claims, 9 Drawing Sheets

214 COMMAND INFORMATION STORAGE UNIT

| OPERATION INSTRUCTION | Xen COMMAND | VMWare COMMAND | ... |
|---|---|---|---|
| START VM | C11 | C21 | |
| STOP VM | C12 | C22 | |
| RESTART VM | C13 | C23 | |
| BACKUP VM | C14 | C24 | |
| MIGRATE VM | C15 | C25 | |
| FORMAT VM | C16 | C26 | |
| TURN ON PHYSICAL SERVER | C17 | C27 | |
| SHUTDOWN PHYSICAL SERVER | C18 | C28 | |
| ⋮ | | | |

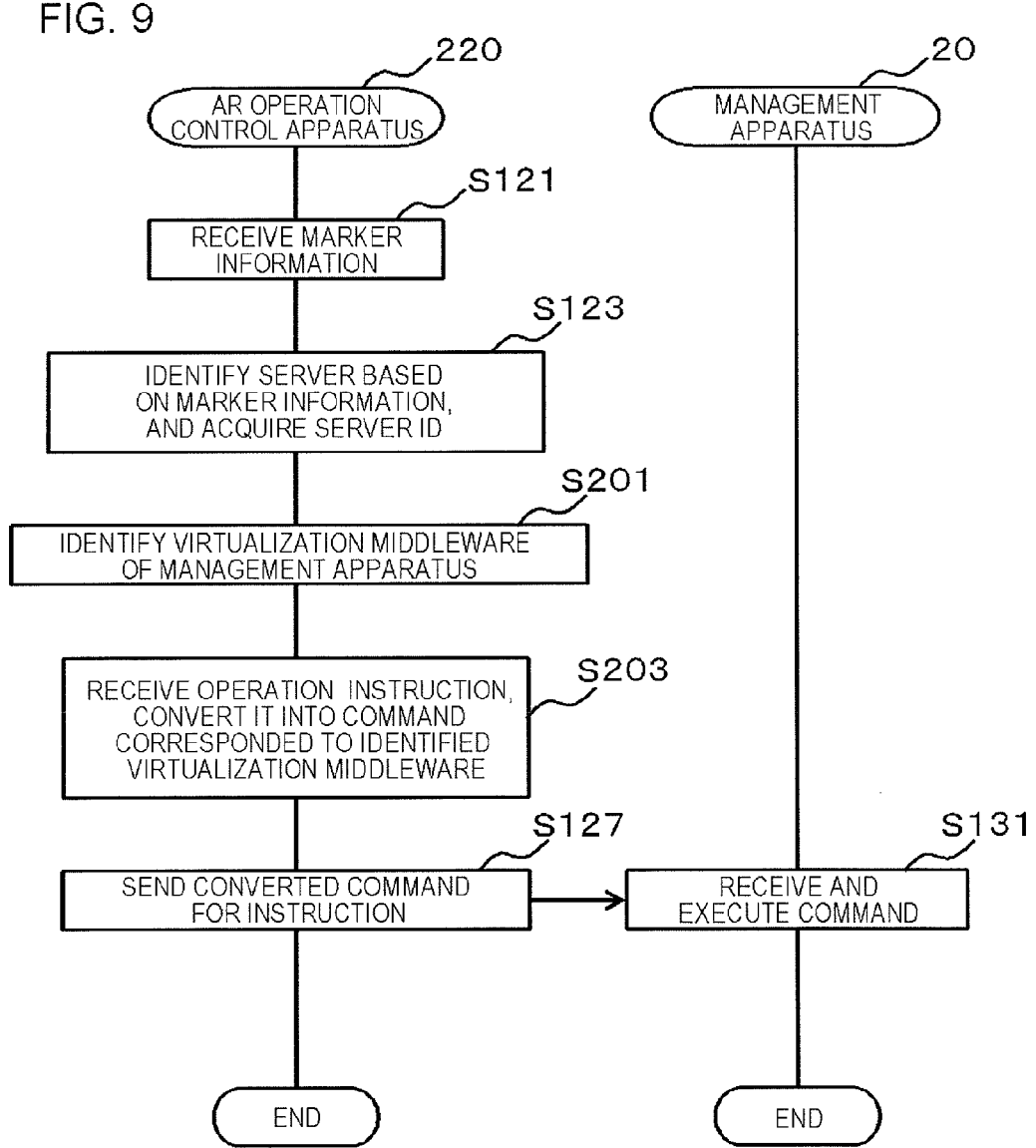

SYSTEM AND METHOD OF MANAGING VIRTUAL MACHINE, AND CONTROL APPARATUS, METHOD AND PROGRAM

CROSS REFERENCE TO RELATED APPLICATIONS

This application is a National Stage of International Application No. PCT/JP2010/002283, filed on Mar. 29, 2010, which claims priority from Japanese Patent Application No. 2009-086921, filed on Mar. 31, 2009, the contents of all of which are incorporated herein by reference in their entirety.

TECHNICAL FIELD

The present invention relates to a Virtual Machine (VM) management system, and in particular to a virtual machine management system for managing a virtual server which runs on a physical server, a method of managing a virtual machine, and a control apparatus for controlling a virtual machine management apparatus, a control method, and a computer program.

BACKGROUND ART

In recent years, server virtualization technique represented by VMware (registered trademark) has begun to diffuse. With the server virtualization technique, a plurality of VMs may be run on a single physical server. While operations management tools for administering the servers have been provided from various suppliers, mapping information teaching "which VM runs on which physical server" has been managed only on a console of the operations management tool (referred to as "management console", hereinafter). Patent Document 1 discloses a typical example of a method of providing and controlling operations management information for a virtual computer system.

Live migration is one of functions provided by the server virtualization technique. With the function, a VM being run on a certain physical server becomes it possible to migrate onto another physical server without interruption. Accordingly, mapping of the VMs and physical servers will vary with time.

On the other hand, a technique called Augmented Reality (AR), which enables computer-assisted addition of information onto a real environment captured by a camera or the like, has been realized. By using AR, it is possible to recognize a three-dimensional coordinate system including a XY plane corresponding to an area on which a specific pattern is displayed, and to show a 3D object on an image captured by a camera.

In conjunction with this sort of system using AR, known techniques are such as dynamically overlaying information relevant to an object on an image captured by a camera, making use of a label having a predetermined pattern called marker printed thereon, or a tag such as Radio Frequency IDentification (RFID) by which the object may be recognized (Patent Documents 2, 3).

For example, Patent Document 2 describes procedures of capturing light emitted from a luminescent RFID tag using a camera, determining position of a target object based on coordinates of the luminescent point, and showing relevant information of the target instrument to be maintained over the image.

On the other hand, Non-Patent Document 1 describes procedures of determining a sort of book based on an image of top cover and position information of the book, and showing additional information of the book over the image.

By combining these techniques, information relevant to operations management of the VMs and the physical servers accumulated on operations management servers (information on loads and performances) may be displayed so as to overlay image of the physical servers captured by the camera.

RELATED DOCUMENTS

Patent Document

[Patent Document 1] Japanese Laid-Open Patent Publication No. 2002-318700
[Patent Document 2] Japanese Laid-Open Patent Publication No. 2007-18188
[Patent Document 3] Japanese Laid-Open Patent Publication No. 2008-299714

Non-Patent Document

[Non-Patent Document 1] Co-written by Katashi NAGAO, edited by Toru ISHIDA, "Ejento Kakucho Genjitukan; Jissekai to Joho Sekai wo Togo suru Ejento (Agent Augmented Reality: Agents Integrate the Real World with Cyberspace), in Japanese", p. 11-14, Section 7.1 "Shop-Navi: A Shopping Assistant", [online], 1998, Nagao Laboratory, Department of Media Science, Graduate School of Information Science, Nagoya University, [from the list of research papers retrieved on Jan. 6, 2009], on Internet <URL: http://www.nagao.nuie.nagoya-u.ac.jp/papers/pdfs/nagao_ccbook98.pdf>

DISCLOSURE OF THE INVENTION

Technical Problem

The AR-based operations management systems, however, for servers described in the aforementioned documents were able to identify position of the object on the captured video image, and to put information over the video image, but were unfortunately unable to allow operation of the object over the video image.

In addition, taking present state of diffusion of the server virtualization technique having already started into account, further diffusion would be difficult unless otherwise a system for exemplary embodiment, also adoptable to an environment of virtualization middleware already put into service, is provided.

It is therefore an object of the invention to provide a virtual machine management system, a method of managing a virtual machine, and a control apparatus for controlling a virtual machine management apparatus, a control method and a computer program, capable of solving any of the above-described problems.

Solution Problem

According to the present invention, there is provided a first virtual machine management system which includes:

a video image acquisition unit which acquires captured video image of a physical server, including a machine identifying marker corresponded to at least one physical server which allows at least one virtual server to run thereon;

a marker information storage device which stores the machine identifying marker and the physical server, the machine identifying marker and the physical server being associated with each other;

a display unit which recognizes the machine identifying marker from the video image acquired by the video image acquisition unit, acquires information regarding executable operations with respect to the physical server corresponded to the recognized machine identifying marker, and the virtual server runnable on the physical server, from a management apparatus capable of operating the physical server and the virtual server, and displays the information on a screen together with the video image of the physical server;

an acceptance unit which accepts an operation instruction which is given to the physical server displayed on the screen and the virtual server runnable on the physical server; and an instruction unit which sends the operation instruction to the management apparatus.

According to the present invention, there is provided a second virtual machine management system which includes:

a management apparatus capable of operating at least one physical server, and at least one virtual server operable on the physical server;

a control apparatus which controls the management apparatus; and a terminal device connected through a network to the management apparatus and the control apparatus.

The terminal device includes:

a video image acquisition unit which acquires captured video image of the physical server, including a machine identifying marker corresponded to the physical server;

a display unit which recognizes the machine identifying marker from the acquired video image, acquires information regarding executable operations with respect to the physical server corresponded to the recognized machine identifying marker, and the virtual server runnable on the physical server, from the management apparatus through the network, and displays the information on a screen together with the video image of the physical server;

an acceptance unit which accepts an operation instruction which is given to the physical server displayed on the screen and the virtual server runnable on the physical server; and a sending unit which sends the operation instruction and the machine identifying marker through the network to the control apparatus.

The control apparatus includes:

a marker information storage device which stores the machine identifying marker and the physical server, the machine identifying marker and the physical server being associated with each other;

a receiving unit which receives the operation instructions and the machine identifying marker from the terminal device through the network; and an instruction unit which sends the operation instruction through the network to the management apparatus.

According to the present invention, there is provided a method of managing a virtual machine wherein a terminal device is connected through a network to a management apparatus capable of operating at least one physical server and at least one virtual server runnable on the physical server, and to a control apparatus having a storage device, and the method includes:

acquiring, by the terminal device, captured video image of the physical server, including a machine identifying marker corresponded to the physical server;

recognizing, by the terminal device, the machine identifying marker from the acquired video image, acquiring information regarding executable operations with respect to the physical server corresponded to the recognized machine identifying marker, and the virtual server runnable on the physical server, from the management apparatus through the network, and displaying the information on a screen together with the video image of the physical server;

accepting, by the terminal device, an operation instruction which is given to the physical server and the virtual server runnable on the physical server displayed on the screen;

sending, by the terminal device, the operation instruction and the machine identifying marker through the network to the control apparatus;

storing, by the control apparatus, the machine identifying marker and the physical server into the storage device, the machine identifying marker and the physical server being associated with each other;

receiving, by the control apparatus, the operation instructions and the machine identifying marker from the terminal device through the network; and sending, by the control apparatus, the operation instruction through the network to the management apparatus.

According to the present invention, there is provided a control apparatus for controlling the management apparatus, which includes:

a marker acquisition unit which acquires a machine identifying marker corresponded to at least one physical server which allows at least one virtual server to run thereon;

a marker information storage device which stores the machine identifying marker and the physical server, the machine identifying marker and the physical server being associated with each other;

an identification unit which identifies the physical server based on the acquired machine identifying marker, referring to the marker information storage device;

an acceptance unit which accepts an operation instruction which is given to the physical server and the virtual server runnable on the physical server; and an instruction unit which sends the operation instruction to the management apparatus capable of operating the physical server and the virtual server.

According to the present invention, there is provided a method of control in a control apparatus, wherein the control apparatus includes a storage device, and is connected to a management apparatus capable of operating at least one physical server and at least one virtual server runnable on the physical server, and the method includes:

making, by the control apparatus, the storage device store therein a machine identifying marker corresponded to the physical server and the physical server into, the machine identifying marker and the physical server being associated with each other:

acquiring, by the control apparatus, the machine identifying marker;

identifying, by the control apparatus, the physical server based on the acquired machine identifying marker, referring to the storage device;

accepting, by the control apparatus, an operation instruction directed to the physical server and the virtual server runnable on the physical server; and sending, by said control apparatus, the operation instruction to the management apparatus.

According to the present invention, there is provided a computer program configured to make a computer embody a control apparatus having a marker information storage device storing a machine identifying marker corresponded to at least one physical server allowing at least one virtual server to run thereon, and the physical server, the machine identifying marker and the physical server being associated with each other, the computer program making the computer perform:

a procedure for acquiring the machine identifying marker;

a procedure for storing the machine identifying marker and the physical server into the marker information storage device, the machine identifying marker and the physical server being associated with each other;

a procedure for identifying the physical server based on the acquired machine identifying marker, referring to the marker information storage device;

a procedure for accepting the operation instructions directed to the physical server and the virtual server runnable on the physical server; and a procedure for sending the operation instructions to a management apparatus.

Note that all arbitrary combinations of the above-described constituents, and all conversions of expression of the invention, made among method, apparatus, system, recording medium and computer program, are valid as the exemplary embodiments of the invention.

Note also that the various constituents of the invention are not necessarily entities independent from each other, so that a plurality of constituents may configure a single component, a single constituent may be configured by a plurality of components, a certain constituent may be a part of other constituent, and a part of a certain constituent may be shared with a part of other constituent.

While the method and the computer program of the invention are expressed by sequentially enumerating a plurality of procedures, the order of enumeration does not restrict the order of execution of such plurality of procedures. Accordingly, when the method and computer program of the invention are embodied, the order of execution of the plurality of procedures may be modified, without adversely affecting the substance of the invention.

The plurality of procedures of the method and the computer program of the invention are not always necessarily executed over different durations. Accordingly, one procedure may arise in the process of execution of other procedure, and, a part of, or the entire portion of, an execution timing of a certain procedure may overlap with an execution timing of other procedure.

Advantageous Effect of Invention

The present invention successfully provides system and method of managing a virtual machine, and, an apparatus, a method and a program for controlling a virtual machine management apparatus, which enable, in a server virtualization environment, operations with respect to VM which runs on a physical server, on a captured video image of the physical server, and enable more efficient operations management of the virtual machine.

BRIEF DESCRIPTION OF THE DRAWINGS

The above and other objects, features and advantages of the present invention will be more apparent from the following description of certain preferred exemplary embodiments taken in conjunction with the accompanying drawings listed below.

FIG. 8 is a drawing illustrating an exemplary configuration of a command information storage unit of the AR operation control apparatus of the virtual machine management system according to the exemplary embodiment of the invention.

FIG. 9 is a flow chart illustrating an exemplary operation of the virtual machine management system according to an exemplary embodiment of the invention.

DESCRIPTION OF EXEMPLARY EMBODIMENTS

Figure 1:
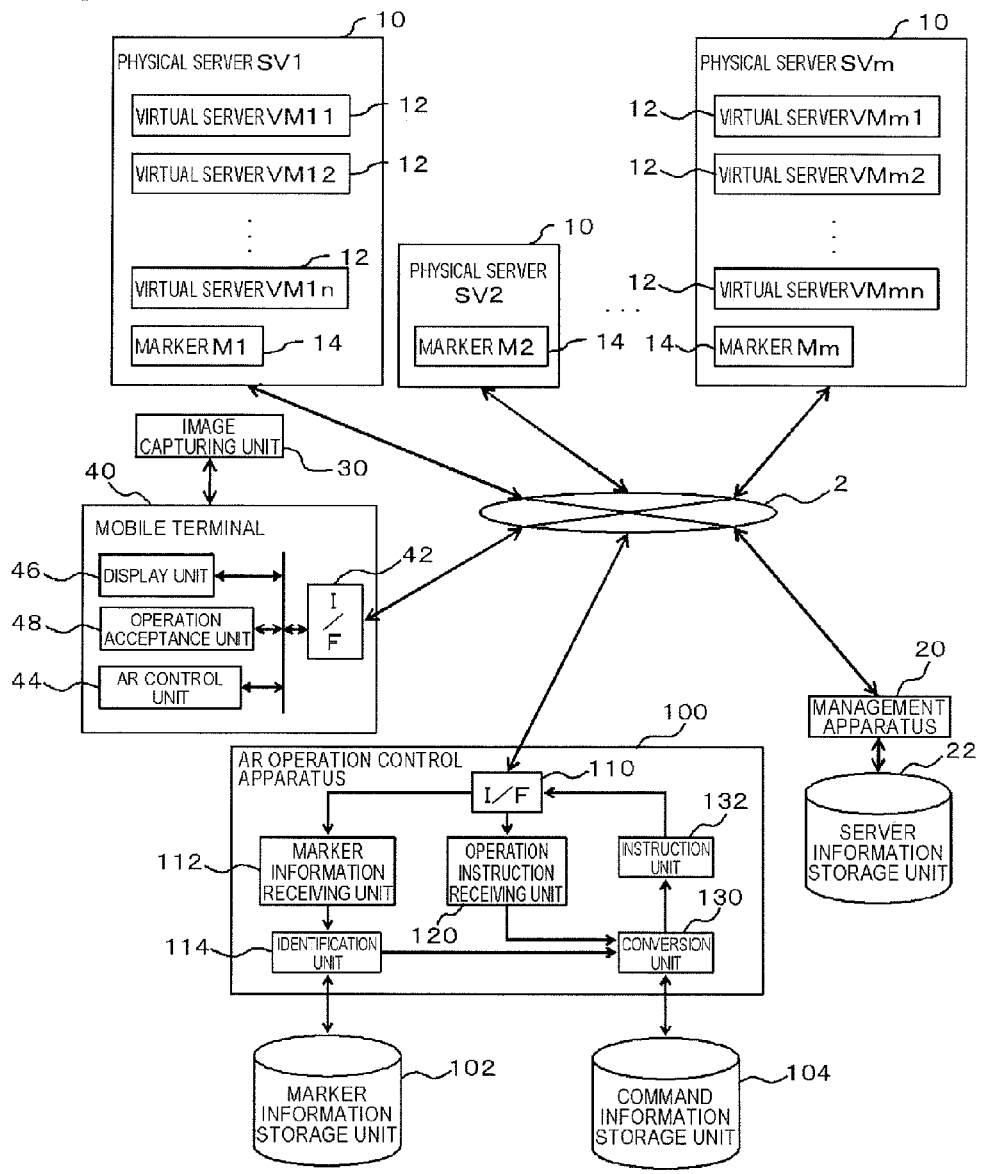
FIG. 1 is a functional block diagram illustrating a configuration of a virtual machine management system according to an exemplary embodiment of the invention.

Exemplary embodiments of the invention will be described below, referring to the attached drawings. Note that all similar constituents will be given similar reference numerals or symbols, and explanations therefor will not be repeated.

First Exemplary Embodiment

FIG. 1 is a functional block diagram illustrating a configuration of the virtual machine management system according to an exemplary embodiment of the invention.

In the exemplary embodiment of the invention, the virtual machine management system includes: a video image acquisition unit which acquires captured video image of a physical server 10, including a machine identifying marker 14 corresponded to at least one physical server 10 which allows at least one virtual server 12 to run thereon; a marker information storage unit 102 which stores the machine identifying marker 14 and the physical server 10, the machine identifying marker 14 and the physical server 10 being associated with each other; a display unit 46 which recognizes the machine identifying marker 14 from the video image acquired by the video image acquisition unit, acquires information regarding executable operations with respect to the physical server 10 corresponded to the recognized machine identifying marker 14, and the virtual server 12 runnable on the physical server 10, from a management apparatus 20 capable of operating the physical server 10 and the virtual server 12, and displays the information on a screen together with the video image of the physical server 10; an acceptance unit (operation acceptance unit 48) which accepts an operation instruction which is given to the physical server 10 and the virtual server 12 runnable on the physical server 10 displayed on the screen; and an instruction unit (an AR operation control apparatus 100, an interface unit 110, an operation instruction receiving unit 120, a conversion unit 130, and an instruction unit 132) which sends the operation instruction to the management apparatus 20.

The virtual machine management system of this exemplary embodiment additionally includes: a command information storage unit 104 which stores commands for operations control to be instructed to the physical server 10 and the virtual server 12 corresponded to the operation instructions; and a conversion unit 130 which converts the operation instruction into the command referring to the command information storage unit 104, passes the command to the management apparatus 20, and makes the management apparatus 20 execute the command.

The virtual machine management system of this exemplary embodiment has a management apparatus 20 capable of operating at least one physical server 10, and at least one virtual server 12 runnable on the physical server 10; a control apparatus (AR operation control apparatus 100) which controls the management apparatus 20; and a terminal device (mobile terminal 40) connected through a network 2 to the management apparatus 20 and the AR operation control apparatus 100.

More specifically, the virtual machine management system of this exemplary embodiment includes a plurality of physical servers 10 (SV1 to SVm) (m is a positive integer), and the management apparatus 20 which controls the individual virtual servers 12 which run on the physical servers 10 (SV1 to SVm). The management apparatus 20 and the physical servers 10 (SV1 to SVm) are connected through the network 2. While the network 2 is not specifically limited, it may be a communication network such as Local Area Network (LAN), Wide Area Network (WAN), or the Internet. Connection of each device of this exemplary embodiment to the network 2 may be accomplished by wired or wireless communication. Further, base stations necessary for the communication are not illustrated in the drawing.

In FIG. 1, the plurality of virtual servers 12 which run on the physical server SV1 are given reference numerals VM11 to VM1n (n is a positive integer), and the plurality of virtual servers 12 which run on the physical server SVm are given discriminative reference numerals VMm1 to VMmn. The physical servers 10 (SV1 to SVm) are given markers 14 (M1 to Mm), respectively. The markers 14 will be described later.

In this exemplary embodiment, by using the mobile terminal 40 equipped with the AR, information regarding the physical servers 10 and the virtual servers 12 running on the physical server 10 may be displayed over the video image of the physical servers 10 captured by an image capturing unit 30.

In this exemplary embodiment, the mobile terminal 40 is configured to include the built-in image capturing unit 30 for capturing an image of the physical servers 10 including the markers 14, but is not limited thereto. The image capturing unit 30 may externally be connected to the mobile terminal 40, and may therefore be attached to the mobile terminal 40. Alternatively, the image capturing unit 30 may be a remote camera permanently provided to sites of installation of the physical servers 10, or may be a camera remotely operable through the network from the mobile terminal 40.

While the system of this exemplary embodiment is configured to use the mobile terminal 40, the configuration of the mobile terminal 40 may be included in the management apparatus 20 in a small-scale system. Accordingly, the video image of the physical servers 10 may be captured and acquired by remote operation, even if the management target physical server 10 is installed in a room different from the room where the management apparatus 20 is installed, or in a remote area. As a result, for example, the management apparatus 20 in the center becomes possible to manage the physical servers 10 installed at a plurality of sites.

The marker 14 may be given as a predetermined geometrical figure, letter, symbol, image, barcode or the like without special limitation. The marker 14 captured in the image may be represented by the specific pattern, and may be good enough if the AR control unit 44 can recognize an area on which the specific pattern is displayed as the X-Y plane based on the video image of the marker 14. For example, the marker 14 may be given as a label having the specific pattern printed thereon, and may be placed typically on a front panel of a housing of the physical server 10. The marker 14 may be placed directly on the housing of the physical server 10, but is not limited thereto. The marker 14 may be good enough if it is provided in a style from which relationship with the physical server 10 is recognizable, and may be placed, for example, on a rack on which the physical server 10 is installed. Alternatively, a display unit may be provided to the physical server 10, so as to show thereon the specific pattern as the marker 14. Still alternatively, a possible configuration may include a luminescent RFID tag described in Patent Document 2, used as the marker 14. An infrared camera may be used as the image capturing unit 30, and the marker 14 herein may be any article recognizable by the infrared camera, such as non-visible marker typically composed of a semi-transparent retroreflective material.

In particular, for an exemplary case where the physical server 10 is installed at a dark place such as warehouse, effective ideas for making the marker 14 more readily recognizable by the image capturing unit 30 include provision of a light functionally linked with the image capturing unit 30 so as to illuminate the marker 14 and make it looks more brighter, or use of the luminescent RFID tag. An alternative configuration may be such as providing a surface-emitting organic ElectroLuminescent (EL) light to a top cover of the mobile terminal 40, such as a top cover of a notebook-sized personal computer, so as to enable capturing of image of the marker 14 while illuminating it using the cover surface of the mobile terminal 40.

FIG. 1 does not illustrate the virtual servers which run on the physical server SV2 for simplicity. Note that the individual drawings below will not show any configuration irrelevant to the essence of the invention for simplicity. All of the virtual servers 12 not always run on each physical server 10 at the same time. Instead operations of the virtual servers 12 may be controlled by instructions issued by the management apparatus 20 depending on needs.

Each constituent of the virtual machine management system of this exemplary embodiment may be embodied by an arbitrary computer in an arbitrary combination of hardware and software, the computer mainly including a CPU, a memory, a program loaded on the memory so as to embody the constitutional elements illustrated in the drawing, a storage unit such as hard disk which stores the program, and an interface for network connection. Those skilled in the art may understand various modifications derived from the methods of exemplary embodiment and relevant devices. The drawings explained below illustrate function-based blocks, rather than hardware-based configuration.

Each of the physical servers 10 (SV1 to SVm) or the management apparatus 20 is a computer equipped with an CPU, a memory, a hard disk and a communication device, all of which are not illustrated. The computer allows connection of input devices such a keyboard, a mouse, and so on, and output devices such as a display, a printer, and so on. The respective functions of the respective constitutional elements may be embodied typically by the computer which executes processes according to computer programs stored in recording media (magnetic disk, semiconductor memory, optical disk, and so forth).

The computer program of this exemplary embodiment is configured to make a computer embody an AR operation control apparatus 100 having a marker information storage unit 102 storing the machine identifying marker 14 corresponded to at least one physical server 10 allowing at least one virtual server 12 to run thereon, and the physical server 10, the machine identifying marker 14 and the physical server 10 being associated with each other, the computer program making the computer perform: a procedure for acquiring the machine identifying marker 14; a procedure for storing the machine identifying marker 14 and the physical server 10 into the marker information storage unit 102, the machine identifying marker 14 and the physical server 10 being associated with each other; a procedure for identifying the physical server 10 based on the acquired machine identifying marker 14, referring to the marker information storage unit 102; a procedure for accepting an operation instruction directed to the physical server 10 and the virtual server 12 runnable on the physical server 10; and a procedure for sending the operation instruction to the management apparatus 20.

The management apparatus 20 includes a server information storage unit 22. The management apparatus 20 is installed therein an existing operations management tool and a virtualization middleware. The management apparatus 20 may be configured to manage operations of the physical servers 10 (SV1 to SVm), and to perform operations (which for start, stop, migration, restart, backup, formatting of the VMs, and so on) on VMs (virtual servers 12) runnable on the physical servers 10. It also takes part in various operations (which for start, stop, restart, backup, formatting, and so on) on the physical servers 10.

The virtualization middleware is typically Xen (registered trademark), VMware or the like. In this exemplary embodiment, the management apparatus 20 is typically configured to use Xen as the virtualization middleware.

In this exemplary embodiment, the management apparatus 20 provides, to the mobile terminal 40, information regarding the physical servers 10 recognized by the mobile terminal 40 and the virtual servers 12 runnable on the physical servers 10, and makes the display unit 46 display the information. The operation acceptance unit 48 of the mobile terminal 40 accepts operations with respect to the physical servers 10 and the virtual servers 12 runnable on the physical servers 10. The AR operation control apparatus 100 converts the operations into commands recognizable by the management apparatus 20. The management apparatus 20 operates and controls the physical servers 10 and the virtual servers 12 runnable on the physical servers 10 according to the commands.

The server information storage unit 22 stores the information regarding administration of the physical servers 10 (SV1 to SVm) and the virtual servers 12 (VM11 to VMmn), as resource information. The resource information includes load information of the physical servers 10 collected at predetermined time intervals (such as utilization of a CPU, a memory, a network I/O, a hard disk I/O, and so forth), and information regarding performances of hardware installed on the respective physical servers 10.

The AR operation control apparatus 100 of this exemplary embodiment includes the marker information storage unit 102 which stores the machine identifying markers 14 and the physical servers 10, the machine identifying marker 14 and the physical server 10 being associated with each other, a marker information receiving unit 112 which receives the operation instruction and the machine identifying marker 14 from the mobile terminal 40 through the network 2, and an instruction unit 132 which sends the operation instruction to the management apparatus 20 through the network 2.

The AR operation control apparatus 100 includes the marker information storage unit 102, and the command information storage unit 104. The AR operation control apparatus 100 converts operations operated on the video image of the physical servers 10 (SV1 to SVm) into commands executable by the management apparatus 20.

Figure 2:
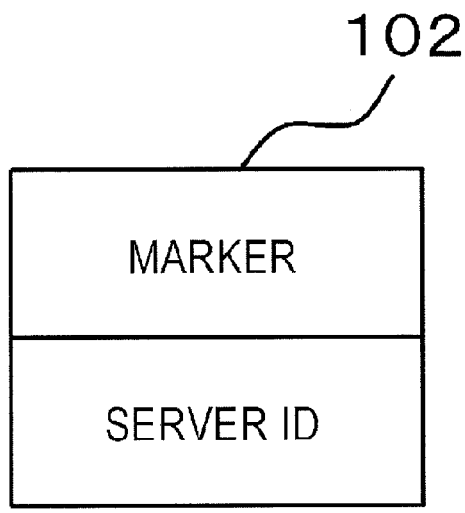
FIG. 2 is a drawing illustrating an exemplary configuration of a storage unit of an AR operation control apparatus of the virtual machine management system according to the exemplary embodiment of the invention.
Figure 2:
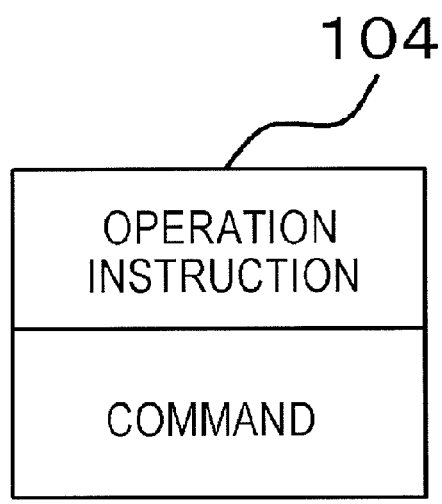

The marker information storage unit 102 manages, as illustrated in FIG. 2(*a*), mapping of the markers 14 (M1 to Mm) respectively attached to the physical servers 10 (SV1 to SVm), and the identification information (server ID) of the physical servers 10 managed by the management apparatus 20.

The command information storage unit 104 manages, as illustrated in FIG. 2(*b*), information for converting operations made on the video image into commands of the management apparatus 20. In this exemplary embodiment, for example, the command information storage unit 104 stores information regarding operations control commands directed to the physical servers 10 or the virtual servers 12 corresponded to the operation instructions accepted by the operation acceptance unit 48 of the mobile terminal 40.

The command information storage unit 104 stores the commands for operations control corresponded to the virtualization middleware of the management apparatus 20. As described in the above, in this exemplary embodiment, since the management apparatus 20 uses Xen as the virtualization middleware, the command information storage unit 104 stores commands of Xen. More specifically, the command information storage unit 104 preliminarily stores information which is used for converting, into the command of an external API of Xen, the operation instruction which is given on the video image of the physical servers 10 (SV1 to SVm) to the virtual servers 12 to perform the operation for start, stop, migration, or the like.

In another exemplary embodiment, for the case where the management apparatus 20 uses VMware as the virtualization middleware, the command information storage unit 104 stores commands of VMware. More specifically, the command information storage unit 104 preliminarily registers therein information which is used for converting, into the command of an external API of VMware, the operation instruction which is given on the video image of the physical servers 10 (SV1 to SVm) to the virtual servers 12 to perform operation for start, stop, migration, or the like.

As described in the above, by preliminarily making, into the command information storage unit 104, entries of the commands corresponded to the virtualization middleware preliminarily introduced to the management apparatus 20, the operation instruction may be converted into command suitable for the management apparatus 20. Accordingly, the virtual machine management system of this exemplary embodiment is readily adoptable to any existing system in a flexible manner, without adding any special configuration.

The mobile terminal 40 of this exemplary embodiment includes the video image acquisition unit (image capturing unit 30) which acquires captured video image of the physical servers 10, including the machine identifying markers 14 corresponded to the physical servers 10; the display unit (display unit 46, AR control unit 44) which recognizes the machine identifying markers 14 from the acquired video image, acquires information regarding executable operations with respect to the physical servers 10 corresponded to the recognized machine identifying markers 14, and the virtual servers 12 runnable on the physical servers 10, from the management apparatus 20 through the network 2, and displays the information on a screen together with the video image of the physical servers 10; the acceptance unit (operation acceptance unit 48, AR control unit 44) which accepts an operation instruction which is given to the physical servers 10 and the virtual servers 12 runnable on the physical servers 10 displayed on the screen; and the sending unit (AR control unit 44, interface unit 42) which sends the operation instruction and the machine identifying markers 14 through the network 2 to the control apparatus (AR operation control apparatus 100).

As described in the above, the mobile terminal 40 includes the image capturing unit 30, recognizes the markers 14 of the physical servers 10 based on the video image captured by the image capturing unit 30, and acquires the information regarding the markers 14. The mobile terminal 40 may be, for example, a notebook-sized personal computer, or, a Personal Digital Assistants (PDA), a mobile phone, a Personal Handyphone System (PHS), a game machine, or any dedicated electronic instruments.

The mobile terminal 40 includes the interface unit (I/F) 42, the AR control unit 44, the display unit 46, and the operation acceptance unit 48. The interface unit 42 is connected to the network 2, and communicates with the individual devices on the network 2. The AR control unit 44 uses AR so as to acquire resource information from the server information storage unit 22 of the management apparatus 20, and enables control of the virtual servers 12 running on the physical servers 10 through the mobile terminal 40 and the management apparatus 20.

In this exemplary embodiment, the AR control unit 44 stores image information of the markers 14 to be recognized, recognizes the markers 14 from the video image of the physical servers 10, and sends the information of the recognized markers 14 through the interface unit 42 to the AR operation control apparatus 100. The information of the marker 14 to be sent may be image data per se found in image areas of the markers 14, or may be information of the markers 14 preliminarily identified for the convenience of recognition of the markers 14. If the marker 14 is given as a barcode, it may be information indicated by the barcode.

The display unit 46 may be a liquid crystal display, organic EL display, Cathode Ray Tube (CRT) monitor or the like, and shows video image captured by the image capturing unit 30, shows resource information of the physical servers 10 and the virtual servers 12, and shows screens including operation instructions directed to the physical servers 10 and the virtual servers 12. The operation acceptance unit 48 may be, for example, a keyboard, a touch panel, a joy stick, a touch pad, a track ball, an operation key, an operation button, a switch, or the like, so as to accept an operation by the user. As described later, the operation acceptance unit 48 accepts the operation instruction to be directed to the physical servers 10 and the virtual servers 12, made on the operation instruction screen of the display unit 46. Further, the AR control unit 44 sends the operation instruction through the interface unit 42 to the AR operation control apparatus 100.

The AR operation control apparatus 100 further includes the interface unit (I/F) 110, the marker information receiving unit 112, an identification unit 114, the operation instruction receiving unit 120, the conversion unit 130, and the instruction unit 132.

The interface unit 110 is connected to the network 2, and communicates with the individual devices on the network 2. The marker information receiving unit 112 receives the information of the marker 14, the information being sent from the mobile terminal 40 through the interface unit 110. The identification unit 114 acquires a server ID from the received information of the marker 14, referring to the marker information storage unit 102, and identifies the physical server 10.

The operation instruction receiving unit 120 receives the operation instruction used for operation control of the physical servers 10 and the virtual servers 12 runnable on the physical servers 10, from the mobile terminal 40 through the interface unit 110. The conversion unit 130 converts the operation instruction received by the operation instruction receiving unit 120 into correspondent command, referring to the command information storage unit 104, and creates a command as the operation instruction directed to the physical servers 10 identified by the identification unit 114 or the virtual servers 12 running on the physical servers 10. More specifically, in an exemplary case where the mobile terminal 40 accepts the operation instruction for starting up the virtual server VM12, the mobile terminal 40 posts the acceptance to the AR operation control apparatus 100 to make the AR operation control apparatus 100 convert, into the command to be executed by the management apparatus 20, the instruction for starting up the virtual server VM12 received from the mobile terminal 40, and to then make the management apparatus 20 execute the command. The instruction unit 132 sends the command converted by the conversion unit 130 to the management apparatus 20 through the interface unit 110 to give the instruction to the management apparatus 20.

Operations of the thus-configured virtual machine management system of this exemplary embodiment will be explained below.

Figure 3:
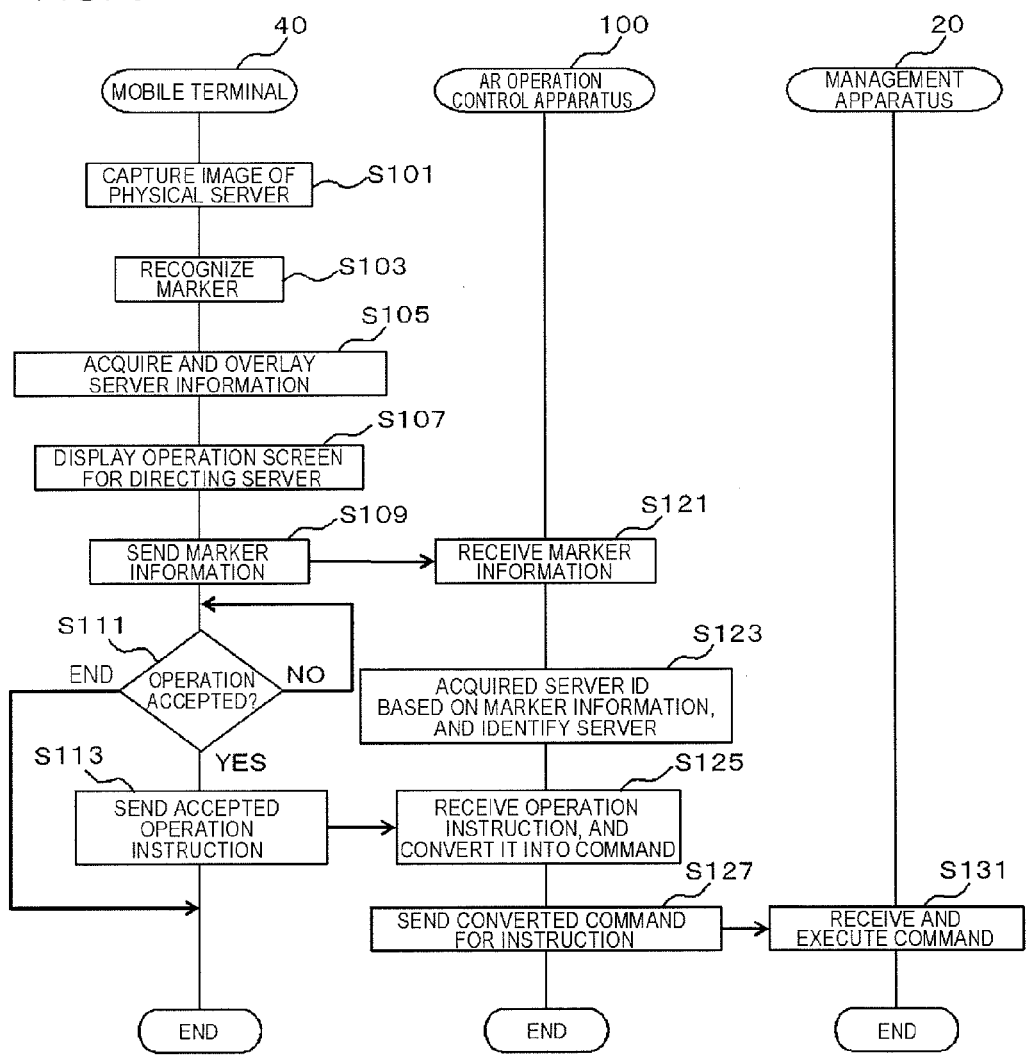
FIG. 3 is a flow chart illustrating an exemplary operation of the virtual machine management system according to the exemplary embodiment of the invention.
Figure 4:
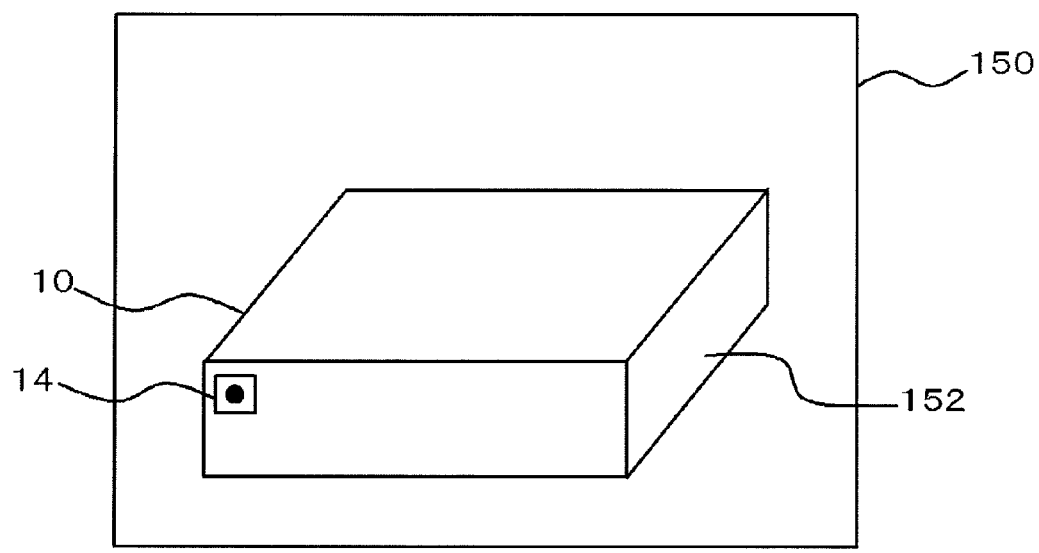
FIG. 4 is a drawing illustrating an exemplary AR operation screen of the virtual machine management system according to the exemplary embodiment of the invention.
Figure 4:
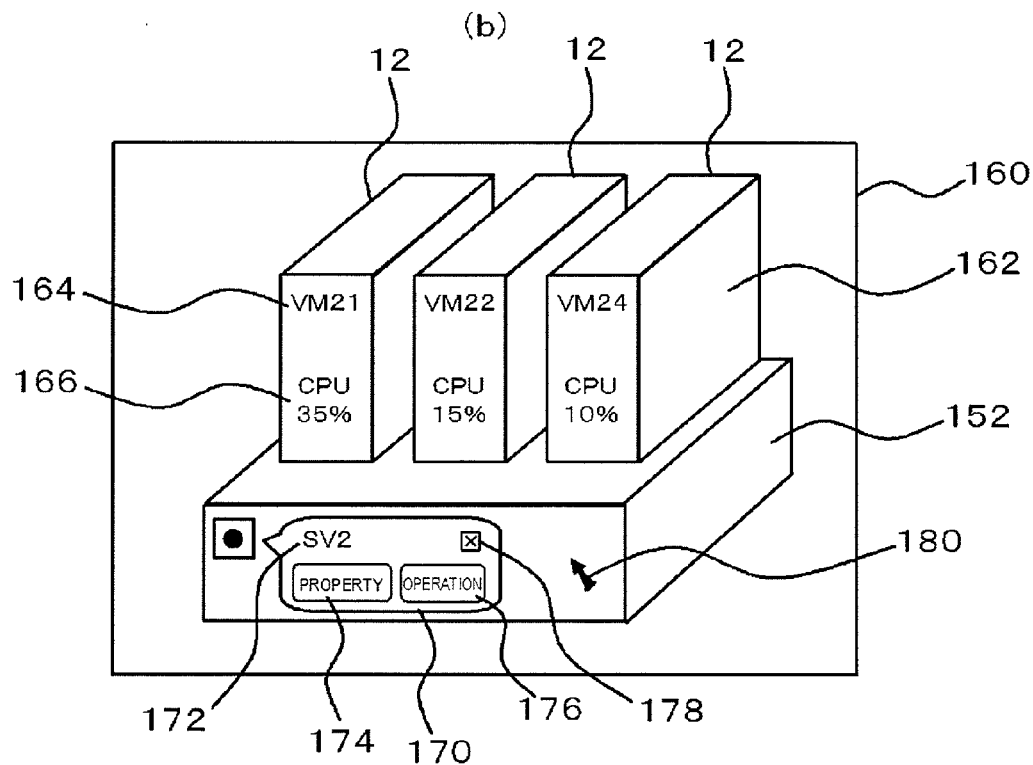

FIG. 3 is a flow chart illustrating exemplary operations of the virtual machine management system according to an exemplary embodiment of the invention. The operations will be explained referring to FIGS. 1 to 7.

The method of managing a virtual machine according to the exemplary embodiment of the invention wherein the terminal device 40 is connected through the network 2 to the management apparatus 20 capable of operating at least one physical server 10 and at least one virtual server 12 runnable on the physical server 10, and to the AR operation control apparatus 100 having the marker information storage unit 102: the method includes: acquiring, by the terminal device 40, captured video image of the physical server 10, including a machine identifying marker 14 corresponded to the physical server 10 (step S101); recognizing, by the terminal device 40, the machine identifying marker 14 from the acquired video image (step S103), acquiring information regarding executable operations with respect to the physical server 10 corresponded to the recognized machine identifying marker 14, and the virtual server 12 runnable on the physical server 10, from the management apparatus 20 through the network 2, and displaying the information on a screen together with the video image of the physical server 10 in a overlaid manner (step S105); accepting, by the terminal device 40, an operation instruction which is given to the physical server 10 and the virtual server 12 runnable on the physical server 10 displayed on the screen (YES in step S111); sending, by the terminal device 40, the operation instruction and the machine identifying marker 14 through the network 2 to the AR operation control apparatus 100 (step S113); storing, the AR operation control apparatus 100, the machine identifying marker 14 and the physical server 10 into the marker information storage unit 102, the machine identifying marker 14 and the physical server 10 being associated with each other; receiving, the AR operation control apparatus 100, the operation instructions and the machine identifying marker 14 from the terminal device 40 through the network 2 (step S121, step S125); and sending, the AR operation control apparatus 100, the operation instructions through the network 2 to the management apparatus 20 (steps S125, S127).

In addition, a method of control according to the exemplary embodiment of the invention wherein the AR operation control apparatus 100 includes the marker information storage unit 102 and is connected to a management apparatus 20 capable of operating at least one physical server 10 and at least one virtual server 12 runnable on the physical server 10, and said method includes: making, by the AR operation control apparatus 100, the marker information storage unit 102 store therein the machine identifying marker 14 corresponded to the physical server 10 and the physical server 10, the machine identifying marker 14 and the physical server 10 being associated with each other; acquiring, by the AR operation control apparatus 100, the machine identifying marker 14 (step S121); identifying, by the AR operation control apparatus 100, the physical server 10 based on the acquired machine identifying marker 14, referring to the storage device 102 (step S123); accepting, by the AR operation control apparatus 100, the operation instruction which is given to the physical server 10 and the virtual server 12 runnable on the physical server 10 (step S125); and sending, by the AR operation control apparatus 100, the operation instruction to the management apparatus 20 (step S127).

First, in the mobile terminal 40, the physical server 10 is captured by the image capturing unit 30 (step S101). As illustrated in FIG. 4(a), for example, a video image presenting screen 150 appears on the display unit 46. On the video image presenting screen 150, a physical server video image 152 of the physical server 10 is presented. The physical server 10 has the marker 14 attached to the front panel of the housing thereof. From the captured video image of the physical server 10, an area of the marker 14 is recognized by the AR control unit 44 (step S103).

The AR control unit 44 then acquires information regarding the physical server 10, and the virtual servers 12 running on the physical server 10, from the management apparatus 20 based on the marker 14, and presents an AR operation screen 160 typically as illustrated in FIG. 4(b) on the display unit 46 (steps S105, S107). In the AR operation screen 160, for example, 3D virtual server Computer Graphics (CG) images 162 of the running virtual servers 12, which are now exemplified by VM21, VM22 and VM24, are presented on the physical server video image 152 of the physical server SV2. Each virtual server CG image 162 of each virtual server 12 may includes, for example, virtual server name 164, CPU utilization 166 and so forth. The AR operation screen 160 additionally includes a server information presenting and operating portion 170 which presents information of the physical server SV2, and a user interface through which operation of the physical server 10 is accessible.

The server information presenting and operating area 170 includes a server name 172 of the physical server SV2, a PROPERTY button 174 through which an instruction for presenting information of the physical server SV2 is accepted, an OPERATION button 176 through which an operation instruction directed to the physical server SV2 is accepted, and a CLOSE button 178 through which an instruction for closing the server information presenting and operating area 170 is accepted. On the AR operation screen 160, also a pointer 180 assisting the user to direct an instruction is given. While FIG. 4(b) representatively illustrates the server information presenting and operating area 170 of the physical server SV2, the server information presenting and operating area 170 may be presented also for the virtual servers 12, typically by pointing and thereby selecting the virtual server CG image 162 of each virtual server 12 using the pointer 180, and thereby the information of the virtual servers 12 may be presented, and the operation instructions may be directed to the virtual server 12.

Figure 5:
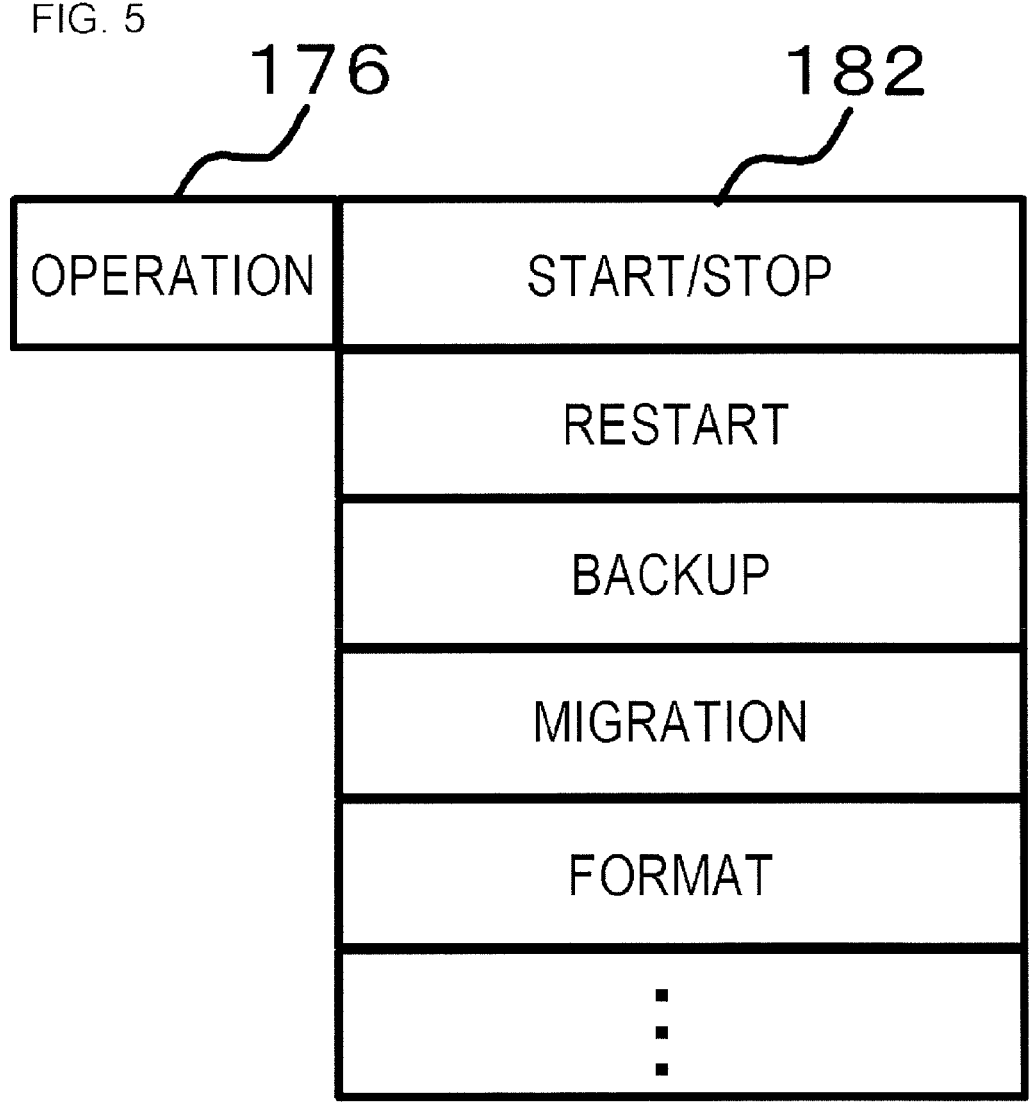
FIG. 5 is a drawing illustrating an exemplary AR operation menu of the virtual machine management system according to the exemplary embodiment of the invention.

By selecting the OPERATION button 176, an operation menu 182 is presented such as illustrated in FIG. 5, through which instructions for operations, such as start, stop, restart, backup, migration, formatting and so forth, may be directed to each server. There are various possible methods of operation on the AR operation screen 160.

Referring now back to FIG. 3, in the mobile terminal 40, the AR control unit 44 sends the information of the marker 14, recognized based on the video image of the physical server 10, to the AR operation control apparatus 100 through the interface unit 42 (step S109).

In the AR operation control apparatus 100, the marker information receiving unit 112 receives the information of the marker 14 sent from the mobile terminal 40 through the interface unit 110 (step S121). The identification unit 114 then acquires the server ID based on the received information of the marker 14, referring to the marker information storage unit 102, and identifies the physical server 10 (step S123).

Figure 6:
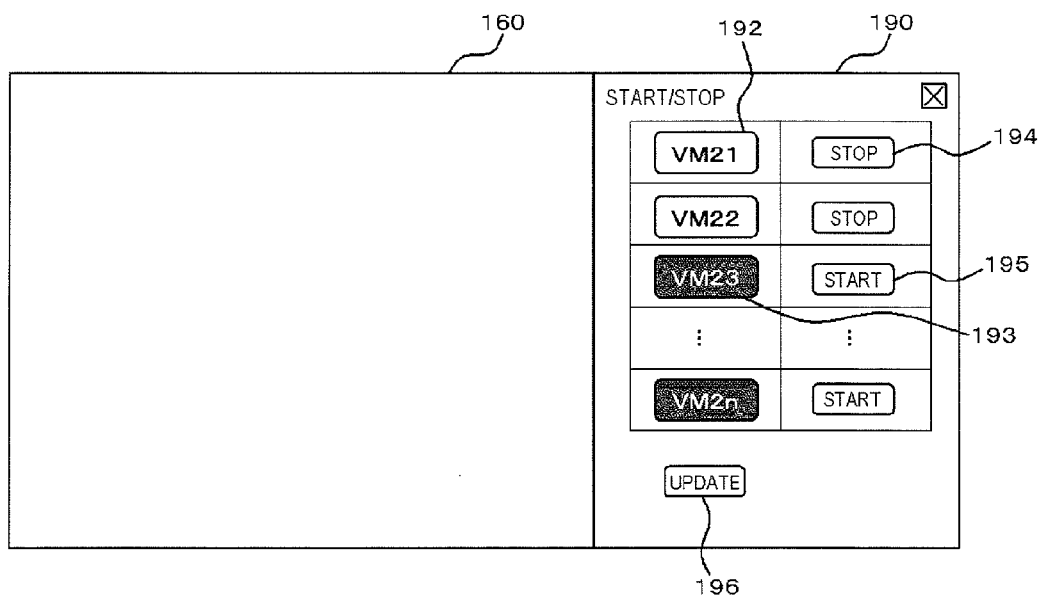
FIG. 6 is a drawing illustrating an exemplary AR operation screen of the virtual machine management system according to an exemplary embodiment of the invention.

On the other hand, in the mobile terminal 40, when the OPERATION button 176 in the server information presenting and operating area 170 on the AR operation screen 160 illustrated in FIG. 4(b) is operated by the user, and start or stop of the server is selected from the operation menu 182 illustrated in FIG. 5, an operation screen 190 such as illustrated in FIG. 6, through which instruction of start or stop of the physical server 10 and the virtual server 12 may be directed, is presented on the display unit 46.

The operation screen 190 may allow the user to start up or shut down the individual virtual servers 12. For example, status indicators represent states of the individual virtual servers 12. The indicator denoted by the reference numeral 192 represents the state of running, the indicator in inverted color denoted by the reference numeral 193 represents the state of shutdown. Also, the operation screen 190 displays thereon a STOP button 194 for shutting down the running virtual server VM21, and a START button 195 for starting up the virtual server VM23 having been stopped. The status indicators 192 and the status indicators 193 represent the latest states of the individual servers, upon operating of an UPDATE button 196.

When the operation acceptance unit 48 accepts the operation instruction entered through the STOP button 194 or the START button 195 on the operation screen 190, the AR control unit 44 sends the operation instruction through the interface unit 42 to the AR operation control apparatus 100.

Figure 7:
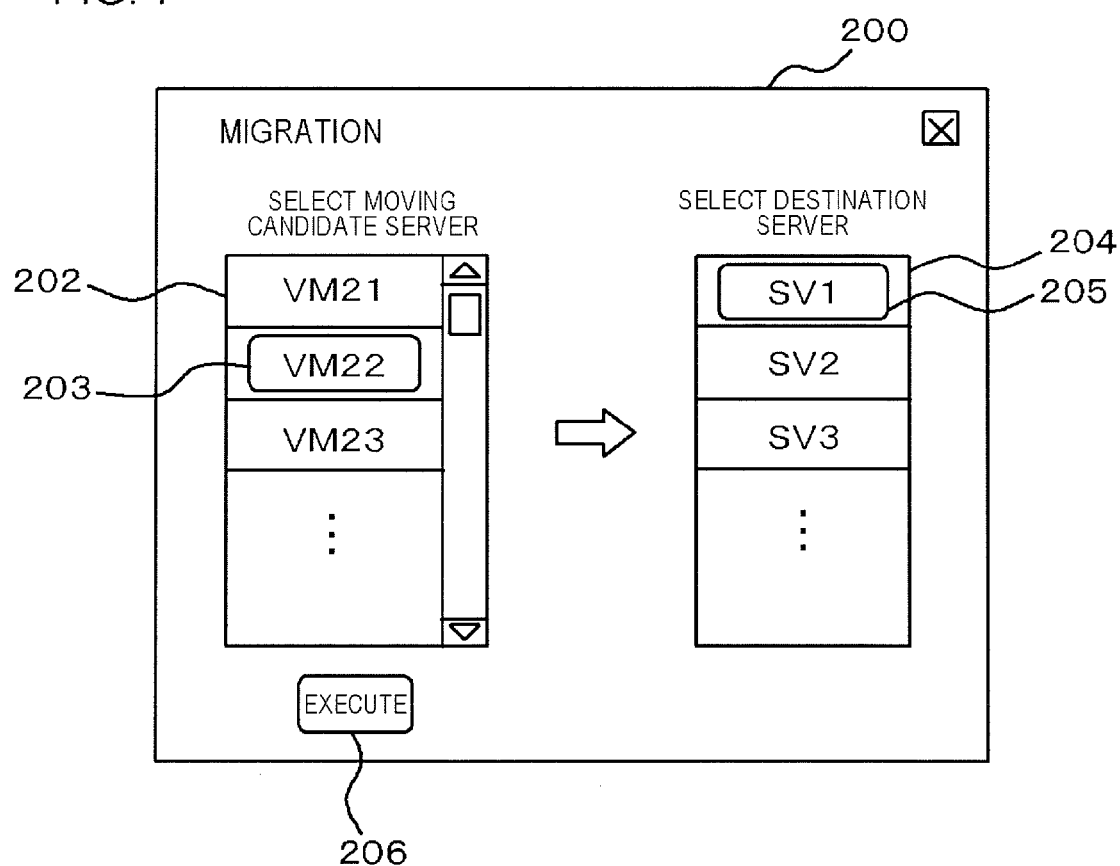
FIG. 7 is a drawing illustrating an exemplary AR operation screen of the virtual machine management system according to an exemplary embodiment of the invention.

FIG. 7 illustrates an exemplary operation screen 200 when "MIGRATION" was selected in the operation menu 182 illustrated in FIG. 5. In the operation screen 200, a moving candidate server list 202 and a destination server list 204 are presented. The operation instruction for "MIGRATION" may be effected by selecting the moving candidate of the virtual server 12 and the destination of the physical server 10 from the respective lists, and by operating a EXECUTE button 206. In the example illustrated in FIG. 7, VM22 is in the state of selected moving candidate presentation 203 as the moving candidate server, and SV1 is in the state of selected destination presentation 205 as the destination server.

In another example, the migration may alternatively be available under an operation instruction effected typically by performing drag-and-drop the virtual server CG image 162 of the moving candidate of the virtual server 12 on the AR operation screen 160 onto the physical server video image 152 of the destination of the physical server 10. Still alternative idea may be such as capturing image of the hand of the user into the AR operation screen 160 together with the video image captured by the image capturing unit 30, so as to effect the instruction for migration based on motion capturing technique, such as capturing motion of the hand typically picking the virtual server CG image 162 of the moving candidate of the virtual server 12, and moving it onto the physical server video image 152 of the destination of the physical server 10.

Referring now back to FIG. 3, at the mobile terminal 40, when the user puts the operation instruction directed to the virtual server 12 on the operation screen of the display unit 46 as described in the above, and the operation acceptance unit 48 accepts the operation instruction (YES in step S111), the AR control unit 44 of the mobile terminal 40 sends the accepted operation instruction through the interface unit 42 to the AR operation control apparatus 100 (step S113). In the AR operation control apparatus 100, the operation instruction receiving unit 120 receives the operation instruction from the mobile terminal 40 through the interface unit 110 (step S125). The conversion unit 130 of the AR operation control apparatus 100 converts the operation instruction received by the operation instruction receiving unit 120 into correspondent command, referring to the command information storage unit 104, and creates a command as the operation instruction directed to the physical servers 10 identified by the identification unit 114 or the virtual servers 12 runnable on the physical servers 10 (step S125).

The instruction unit 132 then sends the converted command through the interface unit 110 to the management apparatus 20 (step S127). The management apparatus 20 executes the command received through the network 2 from the AR operation control apparatus 100, to operate and control the physical servers 10 or the virtual servers 12 (step S131). More specifically, the AR operation control apparatus 100 converts the operation instruction entered at the mobile terminal 40 and directed to the physical servers 10 or the virtual servers 12 running on the physical servers 10 into the command recognizable by the management apparatus 20 and transfers the command to the management apparatus 20, to make the management apparatus 20 operate and control the physical servers 10 or the virtual servers 12 running on the physical servers 10, according to the received commands.

As described in the above, according to the virtual machine management system of this exemplary embodiment, operations made on the video image of the physical servers (SV1 to SVm) may be converted by the AR operation control apparatus 100 into the operation command directed to the management apparatus 20, so that operations for operational management of virtual resources may be enabled by the operation made on the video image of the physical servers 10 (SV1 to SVm). In addition, the operation instruction may be converted into the command executable by the existing management apparatus 20, so that a function of operating the virtual resources on the video image may be added to any already-installed virtualization middleware.

As explained in the above, an exemplary advantage according to the virtual machine management system of this exemplary embodiment is that the virtual servers 12 running on the physical servers 10 may visually be recognized on the screen, and may be operated on the screen. In other words, the operation for operational management of the virtual resources may be effected directly on the video image of the physical servers 10, rather than on a management console of such as the management apparatus 20. Accordingly, the operational management of the virtual resources may be performed in an intuitive and efficient manner.

A function of operating the virtual resources on the video image may be added later to any previously-installed virtualization middleware, only by providing the AR operation control apparatus 100 of this exemplary embodiment. As a consequence, the technique may readily be disseminated. The reason why is that the AR operation control apparatus 100 can convert the operation for the virtual resources made on the captured video image, into the operation directed to the management apparatus 20 based on information regarding the physical servers 10 and the virtual resources collected by the existing management apparatus 20.

Second Exemplary Embodiment

The virtual machine management system according to this exemplary embodiment of the invention is different from the virtual machine management system of the above described exemplary embodiment, in terms of capability of the conversion into the commands corresponded to a plurality of kinds of virtualization middleware of the management apparatus 20, by storing commands for operations control corresponded to the plurality of kinds of virtualization middleware.

The virtual machine management system of this exemplary embodiment is configured to make a command information storage unit 214 (FIG. 8) store different commands for operations control respectively corresponded to a plurality of different kinds of virtualization middleware, and to make the conversion unit 130 convert the operation instruction into the command for operation control corresponded to the virtualization middleware of the management apparatus 20, referring to the command information storage unit 214, and transfer the command to the management apparatus 20 for execution.

More specifically, in the virtual machine management system of this exemplary embodiment, the AR operation control apparatus 220 (FIG. 9) includes a configuration similar to that of the AR operation control apparatus 100 described in the aforementioned exemplary embodiment, except having the command information storage unit 214 illustrated in FIG. 8, in place of the command information storage unit 104.

As illustrated in FIG. 8, the command information storage unit 214 stores commands corresponded to different kinds of virtualization middleware, the commands being associated with the operation instructions. The command information storage unit 214 of this exemplary embodiment stores, for example, Xen commands intended for use when Xen (registered trademark) is adopted as the virtualization middleware, and VMware commands intended for use when VMware is adopted as the virtualization middleware.

In the AR operation control apparatus 220 of this exemplary embodiment, the conversion unit 130 converts the operation instruction received by the operation instruction receiving unit 120 into the command corresponded to the virtualization middleware used by the management apparatus 20, referring to the command information storage unit 214, and creates a command as the operation instruction directed to the physical servers 10 identified by the identification unit 114 or the virtual servers 12 running on the physical servers 10. By allowing preliminary selection and registration of the virtualization middleware used by the management apparatus 20, the AR operation control apparatus 220 can converts the operation instructions into the commands suitable for the management apparatus 20. Change of the virtualization middleware in middle way only needs change in the registration. Even when a new virtualization middleware is employed, the system may readily be adapted thereto without large modification, only by registering the commands of the new virtualization middleware into the command information storage unit 214.

In a case where the virtual machine management system includes a plurality of management apparatuses 20 respectively having different kinds of virtualization middleware installed thereon, the operation instructions may be converted into the commands suitable for the virtualization middleware employed by the individual management apparatuses 20, by preliminarily registering the corresponding virtualization middleware associated with the respective management apparatuses 20.

Operations of the thus-configured virtual machine management system of this exemplary embodiment will be explained below.

FIG. 9 is a flow chart illustrating exemplary operations of the virtual machine management system according to the exemplary embodiment of the invention.

Processes in the mobile terminal 40 are the same as those in the aforementioned exemplary embodiment illustrated in FIG. 3, and are not illustrated in FIG. 9. The AR operation control apparatus 220 is configured to execute steps similar to steps S121, S123 and S127 in FIG. 3, and also to execute steps S201 and S203 described below, in place of step S125 contained in FIG. 3.

The marker 14 of the physical server 10 is recognized by the mobile terminal 40, the information of the marker 14 is sent to the AR operation control apparatus 220, the physical server 10 is identified based on the information of the marker 14 received by the AR operation control apparatus 220 (step S123), and the virtualization middleware used by the management apparatus 20 is identified (step S201). The conversion unit 130 converts, referring to the command information storage unit 214, the operation instruction received by the operation instruction receiving unit 120, such as the operation instruction for starting up the virtual server VM23 into the command corresponded to the virtualization middleware used by the management apparatus 20, which is Xen command C11 herein (FIG. 8) and creates the Xen command as the operation instruction directed to the physical server 10 identified by the identification unit 114 or the virtual server 12 running on the physical server 10 (step S203).

The instruction unit 132 then sends the converted Xen command corresponded to the virtualization middleware of the management apparatus 20 through the interface unit 110 to the management apparatus 20 for instruction (step S127). The management apparatus 20 receives the Xen command (C11: FIG. 8) through the network 2 from the AR operation control apparatus 220, and operates and controls the physical server 10 or the virtual server 12. In the illustrated example herein, the virtual server VM23 is started up (step S131).

As explained in the above, an exemplary advantage according to the virtual machine management system of this exemplary embodiment is that a function of operating the virtual resources on the video image can be added later to an already-installed virtualization middleware, since the AR operation control apparatus 220 can convert the operation made on the video image of the physical servers (SV1 to SVm) into the commands suitable for the existing management apparatus 20, so that. The system is therefore flexibly adoptable to modification or addition of the virtualization middleware of the management apparatus 20.

The exemplary embodiments of the invention were described in the above referring to the attached drawings, merely for the exemplary purposes, while allowing adoption of various configurations other than those described in the above.

For example, while the virtual machine management systems in the aforementioned exemplary embodiments were configured to have the AR operation control apparatus 100 and the AR operation control apparatus 220 separately from the management apparatus 20, the systems are not limited thereto. The management apparatus 20 may contain a computer program capable of embodying various functions of the AR operation control apparatus 100 or the AR operation control apparatus 220. Alternatively, the various functions of the AR operation control apparatus 100 and the AR operation control apparatus 220 may be contained in any of the physical servers 10. While the virtual machine management systems of the aforementioned exemplary embodiments were configured to include the mobile terminal 40, the systems are not limited thereto. The management apparatus 20, the AR operation control apparatus 100 or the AR operation control apparatus 220 may contain a computer program capable of embodying various functions of the mobile terminal 40.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2009-086921 filed on Mar. 31, 2009, the disclosure of which is incorporated herein in its entirety by reference.

The invention claimed is:

1. A virtual machine management system comprising:
a video image acquisition unit which acquires video image data of at least one physical server taken along with a machine identifying marker corresponding to said at least one physical server, said at least one physical server allowing at least one virtual server to run thereon, said machine identifying marker being represented by a specific pattern recognizable as the corresponding at least one physical server, said machine identifying marker labeling said corresponding at least one physical server, and said video image data of said at least one physical server not showing said at least one virtual server;
a marker information storage device which stores said machine identifying marker and said at least one physical server, said machine identifying marker and said at least one physical server being associated with each other;
a display unit which recognizes said specific pattern of the machine identifying marker from the video image acquired by said video image acquisition unit, identifies the corresponding at least one physical server based on said machine identifying marker by referring to said marker information storage device, acquires information regarding executable operations with respect to the identified at least one physical server and the virtual server runnable on said at least one physical server, from a management apparatus capable of operating said at least one physical server and said virtual server, and displays said information on a screen together with said video image of said physical server in an overlaid manner;
an acceptance unit which accepts an operation instruction which is given to at least one of said identified at least one physical server and said identified at least one virtual server runnable on said at least one physical server; and
an instruction unit which sends said operation instruction to said management apparatus, so that said management apparatus operates and controls said at least one physical server or said at least one virtual server in accordance with said operation instruction.

2. The virtual machine management system according to claim 1, further comprising:
a command storage device which stores commands for operations control to be instructed to said at least one physical server and said at least one virtual server corresponded to said operation instructions; and a conversion unit which converts said operation instruction into the command referring to said command storage device, passes said command to said management apparatus, and makes said management apparatus execute said command.

3. The virtual machine management system according to claim 2,
wherein said command storage device stores commands for operations control with respect to a virtualization middleware which corresponds to said management apparatus.

4. The virtual machine management system according to claim 3,
wherein said command storage device respectively stores different commands for operations control with respect to a plurality of different kinds of virtualization middleware, and
said conversion unit converts said operation instruction into the command for operation control with respect to said virtualization middleware of said management apparatus, referring to said command storage device, passes said command to said management apparatus, and makes said management apparatus execute said command.

5. The virtual machine management system according to claim 1, further comprising:
an image capturing unit which captures not only said video image of said at least one physical server, but also an image of said machine identifying marker of said at least one physical server, and
said video image acquisition unit acquires said video image of said at least one physical server including said machine identifying marker captured by said image capturing unit.

6. The virtual machine management system according to claim 1,
wherein said operation instructions being displayed over said video image displayed on said display unit are given to said at least one physical server and said at least one virtual server to make said at least one physical server or said at least one virtual server perform operations for start, stop, restart, backup, migration, and formatting.

7. The virtual machine management system according to claim 1, comprising:
a terminal device having said video image acquisition unit, said display unit, and said acceptance unit,
wherein said terminal device is connected through a network to said management apparatus.

8. The virtual machine management system according to claim 7,
wherein said terminal device further has said image capturing unit which captures an image of said at least one physical server.

9. The virtual machine management system according to claim 7, comprising:
a control apparatus having said instruction unit,
wherein said control apparatus is connected through a network to said management apparatus and said terminal device.

10. A virtual machine management system comprising:
a management apparatus capable of operating at least one physical server, and at least one virtual server operable on said at least one physical server;
a control apparatus which controls said management apparatus; and
a terminal device connected through a network to said management apparatus and said control apparatus,
said terminal device comprising:
a video image acquisition unit which acquires video image data of said at least one physical server, taken along with a machine identifying marker corresponding to said at least one physical server, said machine identifying marker being represented by a specific pattern recognizable as the corresponding at least one physical server, said machine identifying marker labeling said corresponding at least one physical server, and said video image data of said at least one physical server not showing said at least one virtual server;
a display unit which recognizes said specific pattern of the machine identifying marker from the acquired video image data, identifies the corresponding at least one physical server based on said machine identifying marker by referring to a marker information storage device, acquires information regarding executable operations with respect to the at least one physical server and the at least one virtual server runnable on said at least one physical server, from said management apparatus through said network, and displays said information on a screen together with said video image of said at least one physical server in an overlaid manner;
an acceptance unit which accepts an operation instruction which is given to said at least one physical server displayed and said at least one virtual server runnable on said at least one physical server; and
a sending unit which sends said operation instruction and said machine identifying marker through said network to said control apparatus, so that said management apparatus operates and controls said at least one physical server or said at least one virtual server in accordance with said operation instruction,
and,
said control apparatus comprising:
the marker information storage device, which stores said machine identifying marker and said at least one physical server, said machine identifying marker and said at least one physical server being associated with each other;
a receiving unit which receives said operation instruction and said machine identifying marker from said terminal device through said network; and
an instruction unit which sends said operation instruction through said network to said management apparatus.

11. A method of managing a virtual machine wherein a terminal device is connected through a network to a management apparatus is capable of operating at least one physical server and at least one virtual server runnable on said physical server, and to a control apparatus having a storage device, and said method comprises:
acquiring, by said terminal device, video image data of said at least one physical server, taken along with a machine identifying marker corresponding to said at least one physical server, said machine identifying marker being represented by a specific pattern recognizable as the corresponding at least one physical server, and said video image data of said at least one physical server not showing said at least one virtual server;
recognizing, by said terminal device, said specific pattern of the machine identifying marker from the acquired video image, identifying the corresponding at least one physical server based on said machine identifying marker by referring to a marker information storage device, acquiring information regarding executable operations with respect to the identified at least one physical server and the at least one virtual server runnable on said at least one physical server, from said management apparatus through said network, and displaying said information on a screen together with said video image of said at least one physical server in an overlaid manner;

accepting, by said terminal device, an operation instruction which is given to said at least one of said identified at least one physical server and said at least one virtual server runnable on said at least one physical server;

sending, by said terminal device, said operation instruction and said machine identifying marker through said network to said control apparatus, so that said management apparatus operates and controls said at least one physical server or said at least one virtual server in accordance with said operation instruction;

storing, by said control apparatus, said machine identifying marker and said at least one physical server into said storage device, said machine identifying marker and said at least one physical server being associated with each other;

receiving, by said control apparatus, said operation instruction and said machine identifying marker from said terminal device through said network; and sending, by said control apparatus, said operation instruction through said network to said management apparatus.

12. A control apparatus for controlling a management apparatus, comprising:
a marker acquisition unit which acquires a machine identifying marker corresponding to at least one physical server, said at least one physical server allowing at least one virtual server to run thereon, said machine identifying marker being represented by a specific pattern recognizable as the corresponding at least one physical server, and video image data of said at least one physical server not showing at least one virtual server;
a marker information storage device which stores said machine identifying marker and said at least one physical server, said machine identifying marker and said at least one physical server being associated with each other;
an identification unit which identifies the at least one physical server based on the acquired machine identifying marker, referring to said marker information storage device;
an acceptance unit which accepts an operation instruction which is given to said at least one physical server and said at least one virtual server runnable on said at least one physical server; and
an instruction unit which sends said operation instruction to said management apparatus capable of operating said at least one physical server and said at least one virtual server, such that said management apparatus operates and controls said at least one physical server or said at least one virtual server in accordance with said operation instruction.

13. The control apparatus according to claim 12, further comprising:
a command storage device which stores commands for operations control directed to said at least one physical server and said at least one virtual server corresponded to said operation instructions, and
a conversion unit which converts said operation instruction into the command, referring to said command storage device, passes said command to said management apparatus, and makes said management apparatus execute said command.

14. The control apparatus according to claim 13,
wherein said command storage device stores commands for operations control with respect to a virtualization middleware which corresponds to said management apparatus.

15. The control apparatus according to claim 14,
wherein said command storage device respectively stores different commands for operations control with respect to a plurality of different kinds of virtualization middleware, and
said conversion unit converts said operation instruction into the command for operations control with respect to said virtualization middleware of said management apparatus, referring to said command storage device, passes said command to said management apparatus, and makes said management apparatus execute said command.

16. The control apparatus according to claim 12,
wherein said operations control being accepted by said acceptance unit are given to said at least one physical server and said at least one virtual server to make said at least one physical server or said at least one virtual server to perform operations control for start, stop, restart, backup, migration, and formatting of said at least one physical server or said at least one virtual server.

17. The control apparatus according to claim 12,
being configured to be included in said management apparatus.

18. The control apparatus according to claim 12, further comprising:
a video image acquisition unit which acquires captured video image, including said machine identifying marker corresponded to said at least one physical server; and
a display unit which recognizes the machine identifying marker from the acquired video image, acquires information regarding executable operations with respect to said at least one physical server corresponded to the recognized machine identifying marker, and said at least one virtual server runnable on said at least one physical server, from said management apparatus through said network, and displays said information on a screen together with said video image of said at least one physical server,
wherein said marker acquisition unit acquires the machine identifying marker from said video image of said at least one physical server acquired by said video image acquisition unit, and
said acceptance unit accepts the operation instruction which is given to said at least one physical server and said at least one virtual server runnable on said at least one physical server displayed on said screen.

19. A method of control in a control apparatus, wherein said control apparatus comprises a storage device and is connected to a management apparatus capable of operating at least one physical server and at least one virtual server runnable on said at least one physical server, and
said method comprises:
making, by said control apparatus, said storage device store therein a machine identifying marker corresponding to said at least one physical server and said at least one physical server, said machine identifying marker and said at least one physical server being associated with each other, said machine identifying marker being represented by a specific pattern recognizable as the corresponding at least one physical server, said machine identifying marker labeling said corresponding at least one physical server;

acquiring, by said control apparatus, the machine identifying marker;

identifying, by said control apparatus, the at least one physical server based on the acquired machine identifying marker, referring to said storage device;

accepting, by said control apparatus, an operation instruction which is given to said at least one physical server and said at least one virtual server runnable on said at least one physical server; and sending, by said control apparatus, said operation instruction to said management apparatus, so that said management apparatus operates and controls said at least one physical server or said at least one virtual server in accordance with said operation instruction.

20. A computer program embodied or recorded on a non-transitory computer readable medium configured to make a computer embody a control apparatus having a marker information storage device storing a machine identifying marker corresponding to at least one physical server, said at least one physical server allowing at least one virtual server to run thereon, said computer program making said computer perform:

a procedure for acquiring the machine identifying marker, said machine identifying marker being represented by a specific pattern recognizable as the corresponding at least one physical server, and video image data of said at least one physical server not showing at least one virtual server, and said at least one physical server, said machine identifying marker and said at least one physical server being associated with each other;

a procedure for storing said machine identifying marker and said at least one physical server into said marker information storage device, said machine identifying marker and said at least one physical server being associated with each other;

a procedure for identifying the at least one physical server based on the acquired machine identifying marker, referring to said marker information storage device;

a procedure for accepting an operation instruction which is given to said at least one physical server and said virtual server runnable on said at least one physical server; and a procedure for sending said operation instruction to a management apparatus capable of operating said at least one physical server and said at least one virtual server, such that said management apparatus operates and controls said at least one physical server or said at least one virtual server in accordance with said operation instruction.

21. A virtual machine management system comprising:

video image acquisition means for acquiring video image data of at least one physical server, taken along with a machine identifying marker corresponding to said at least one physical server, said at least one physical server allowing at least one virtual server to run thereon, said machine identifying marker being represented by a specific pattern recognizable as the corresponding at least one physical server, said machine identifying marker labeling said corresponding at least one physical server, sand said video image data of said at least one physical server not showing said at least one virtual server;

a marker information storage device for storing said machine identifying marker and said at least one physical server, said machine identifying marker and said at least one physical server being associated with each other;

display means for recognizing said specific pattern of the machine identifying marker from the video image acquired by said video image acquisition means, identifying the corresponding at least one physical server based on said machine identifying marker by referring to said marker information storage device, acquiring information regarding executable operations with respect to the identified at least one physical server and the at least one virtual server runnable on said at least one physical server, from a management apparatus capable of operating said at least one physical server and said at least one virtual server, and displaying said information on a screen together with said video image of said at least one physical server in an overlaid manner;

acceptance means for accepting an operation instruction which is given to said at least one said identified at least one physical server and said at least one virtual server runnable on said at least one physical server; and instruction means for sending said operation instruction to said management apparatus, so that said management apparatus operates and controls said at least one physical server or said at least one virtual server in accordance with said operation instruction.

22. A virtual machine management system comprising:

a management apparatus capable of operating at least one physical server, and at least one virtual server operable on said physical server;

a control apparatus which controls said management apparatus; and a terminal device connected through a network to said management apparatus and said control apparatus, said terminal device comprising:

video image acquisition means for acquiring video image data of said at least one physical server, taken along with a machine identifying marker corresponding to said at least one physical server, said machine identifying marker being represented by a specific pattern recognizable as the corresponding at least one physical server, said machine identifying marker labeling said corresponding at least one physical server, and said video image data of said at least one physical server not showing said at least one virtual server;

display means for recognizing said specific pattern of the machine identifying marker from the acquired video image data, identifies the corresponding at least one physical server based on said machine identifying marker by referring to a marker information storage device, acquires information regarding executable operations with respect to the at least one physical server and the at least one virtual server runnable on said at least one physical server, from said management apparatus through said network, and displays said information on a screen together with said video image of said at least one physical server in an overlaid manner;

acceptance means for accepting an operation instruction which is given to said at least one physical server displayed and said at least one virtual server runnable on said at least one physical server; and sending means for sending said operation instruction and said machine identifying marker through said network to said control apparatus, so that said management apparatus operates and controls said at least one physical server or said at least one virtual server in accordance with said operation instruction, and, said control apparatus comprising:
the marker information storage device, which stores said machine identifying marker and said at least one physical server, said machine identifying marker and said at least one physical server being associated with each other;
receiving means for receiving said operation instruction and said machine identifying marker from said terminal device through said network; and
instruction means for sending said operation instruction through said network to said management apparatus.

23. A control apparatus for controlling a management apparatus, comprising:
marker acquisition means for acquiring a machine identifying marker corresponding to at least one physical server, said at least one physical server allowing at least one virtual server to run thereon, said machine identifying marker being represented by a specific pattern recognizable as the corresponding at least one physical server, and video image data of said at least one physical server not showing at least one virtual server;
a marker information storage device which stores said machine identifying marker and said at least one physical server, said machine identifying marker and said at least one physical server being associated with each other;
identification means for identifying the at least one physical server based on the acquired machine identifying marker, referring to said marker information storage device;
acceptance means for accepting an operation instruction which is given to said at least one physical server and said at least one virtual server runnable on said at least one physical server; and
instruction means for sending said operation instruction to said management apparatus capable of operating said at least one physical server and said at least one virtual server, such that said management apparatus operates and controls said at least one physical server or said at least one virtual server in accordance with said operation instruction.

* * * * *

UNITED STATES PATENT AND TRADEMARK OFFICE
CERTIFICATE OF CORRECTION

PATENT NO. : 8,924,968 B2  
APPLICATION NO. : 13/255796  
DATED : December 30, 2014  
INVENTOR(S) : Toshinori Takemura Page 1 of 1

It is certified that error appears in the above-identified patent and that said Letters Patent is hereby corrected as shown below:

In the Specification

Column 15, Line 37: Delete "servers (SV1 to" and insert -- servers 10 (SV1 to --

Column 17, Line 49: Delete "servers (SV1 to" and insert -- servers 10 (SV1 to --

In the Claims

Column 23, Line 64: In Claim 21, delete "sand" and insert -- and --

Signed and Sealed this
Sixteenth Day of June, 2015

Michelle K. Lee
*Director of the United States Patent and Trademark Office*